N. Chapman.
Churn.

N° 88,847. Patented Apr. 13, 1869.

Witnesses: J. Dennis Jr. W. Dennis

Inventor: Nathan Chapman

NATHAN CHAPMAN, OF MILFORD, MASSACHUSETTS.

Letters Patent No. 88,847, dated April 13, 1869.

IMPROVEMENT IN CHURNS.

The Schedule referred to in these Letters Patent and making part of the same.

*To all whom it may concern:*

Be it known that I, NATHAN CHAPMAN, of Milford, Worcester county, State of Massachusetts, have invented an Improved Churn; and I do hereby declare the following description and accompanying drawings are sufficient to enable any person skilled in the art or science, to which it most nearly appertains, to make and use my said invention or improvements, without further invention or experiment.

The nature of my invention and improvements consists in making an opening into the hollow horizontal shaft of an atmospheric churn, through the journal of said shaft at the end where the gear, crank, or other device for giving it motion is applied; and in making the driving-wheel with a flange across the spaces at the ends of the teeth, with an opening to admit the teeth of the pinion driven by the wheel.

In the following description of my improvements, reference is made to the accompanying drawings, forming part of this specification—

Figure 1:
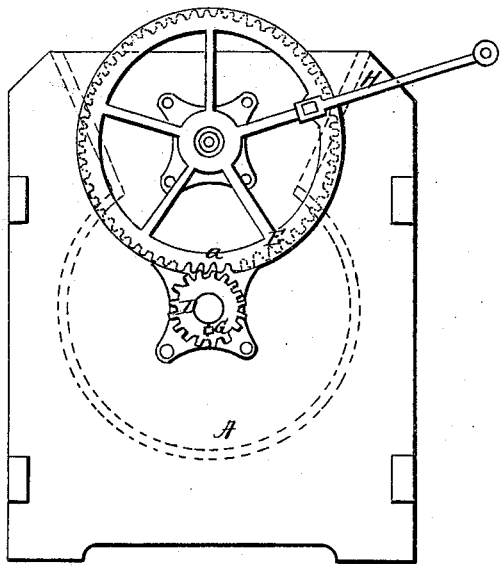

Figure 1 being an elevation of one end, and

Figure 2:
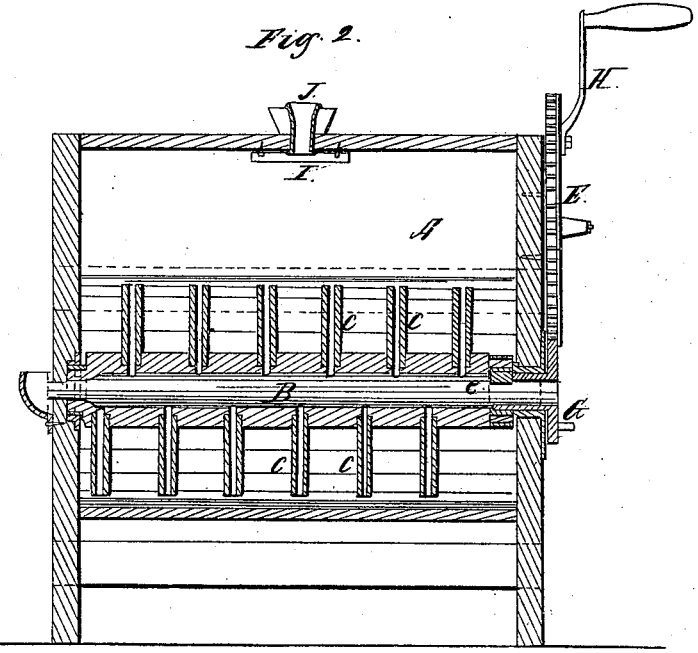

Figure 2, a vertical section through the centre of the shaft of a churn with my improvements.

A is the box of the churn, having a cylindrical bottom, within which the hollow shaft B, with its communicating hollow arms, or paddles C C revolves, the ends of the box extending below the cylindrical part to form a stand for the churn.

The journals of the shaft B turn in boxes in the ends of the churn, and that one at the end where the power is to be applied, is made hollow, and fastened to the pinion D, the opening extending through both the journal and pinion. This journal is put through its box from the outside, and fits into the end of the hollow shaft, being coupled to it by the check-pin *e*, which fits into a score cut in the end of the journal.

When operating, both the journal and pinion are kept in place by the flange on the driving-wheel E, and as the air within the hollow paddles C C issues forth into the contents of the churn, a supply is furnished from this end of the shaft, as well as from the other end, which may be constructed and arranged as described and claimed in the patent granted me January 30, 1866, No. 52,268.

To allow the pinion D, with its journal, as well as the shaft and paddles, to be readily removed from the box, the spaces between the teeth of the wheel E are extended through the flange for a short distance, as shown at *a*, or a portion of the flange itself may be omitted for the same purpose, and the teeth of the pinion may then be drawn through, and the pinion taken off without removing the wheel E.

The stud G is placed upon the pinion D in order that the crank, H, may be transferred to it, and the power applied directly to the pinion, when a slow motion of the shaft B is required or desirable.

The plate I is placed under and somewhat below the vent J, so as to prevent the contents of the churn from being driven through the vent by the air issuing from the revolving paddles, and at the same time permit the air itself to escape through the vent.

What I claim as my invention and improvement in churns with hollow horizontal paddle shafts, is—

1. Making the hole, or opening in the shaft to extend entirely through the journal, at the end where the gear, pulley, or crank is applied, so as to supply the paddles, or a part of them, with air through the journal at the end where the motive power is applied, substantially as described.

2. Making the driving-wheel with a flange across the spaces at the ends of the teeth, with an opening to admit the teeth of the pinion driven by the wheel, substantially as described.

NATHAN CHAPMAN.

Witnesses:
J. DENNIS, Jr.,
WM. DENNIS.